(12) United States Patent
Anumala et al.

(10) Patent No.: US 12,610,236 B2
(45) Date of Patent: Apr. 21, 2026

(54) REMOTE AUTHENTICATION CREDENTIAL EXCHANGE

(71) Applicant: QUALCOMM Incorporated, San Diego, CA (US)

(72) Inventors: Sridhar Anumala, Hyderabad (IN); Santhosh Reddy Akavaram, Hyderabad (IN); Raghavendra Lakshman, Hyderabad (IN); Abhishek Mishra, Ranchi (IN); Aryan Chauhan, Haridwar (IN); Anuj Agrawal, Kolkata (IN); Sanjay Verdu, Tirupati (IN); Vinod Kumar Enapakurthi, Vizianagaram (IN); Sai Praneeth Sreeram, Anantapur (IN); Surendra Paravada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 18/613,814

(22) Filed: Mar. 22, 2024

(65) Prior Publication Data

US 2025/0301321 A1     Sep. 25, 2025

(51) Int. Cl.
*H04W 12/06* (2021.01)

(52) U.S. Cl.
CPC ................................. *H04W 12/068* (2021.01)

(58) Field of Classification Search
CPC ........................... H04W 12/068; H04W 12/72
See application file for complete search history.

(56) References Cited

U.S. PATENT DOCUMENTS

| | | | |
|---|---|---|---|
| 7,234,157 B2 * | 6/2007 | Childs | H04L 63/08 726/5 |
| 9,401,916 B2 * | 7/2016 | Ganem | H04L 63/0869 |
| 11,411,943 B2 * | 8/2022 | Mallinson | H04L 9/3263 |
| 2009/0034736 A1 * | 2/2009 | French | H04L 63/062 380/278 |
| 2012/0124676 A1 * | 5/2012 | Griffin | H04L 63/0815 726/28 |
| 2016/0241542 A1 * | 8/2016 | Kim | H04L 63/083 |
| 2016/0242033 A1 * | 8/2016 | Jung | H04W 12/069 |
| 2016/0260078 A1 * | 9/2016 | Phillips | G06Q 20/40145 |
| 2025/0301321 A1 * | 9/2025 | Anumala | H04W 12/06 |

* cited by examiner

*Primary Examiner* — Ponnoreay Pich
(74) *Attorney, Agent, or Firm* — AVEK IP, LLC (QUALCOMM)

(57) ABSTRACT

This disclosure provides methods, components, devices, and systems for providing remote authentication information exchange for a system service in a secure device ecosystem. Some aspects more specifically relate to exchanging credential information between two devices in the secure device ecosystem, including manually entered passwords and stored credentials such as stored biometric credentials. Remote credential information exchanged between the two devices is provided to a system service on one of the devices by updating missing credential information using the remote credential information.

26 Claims, 10 Drawing Sheets

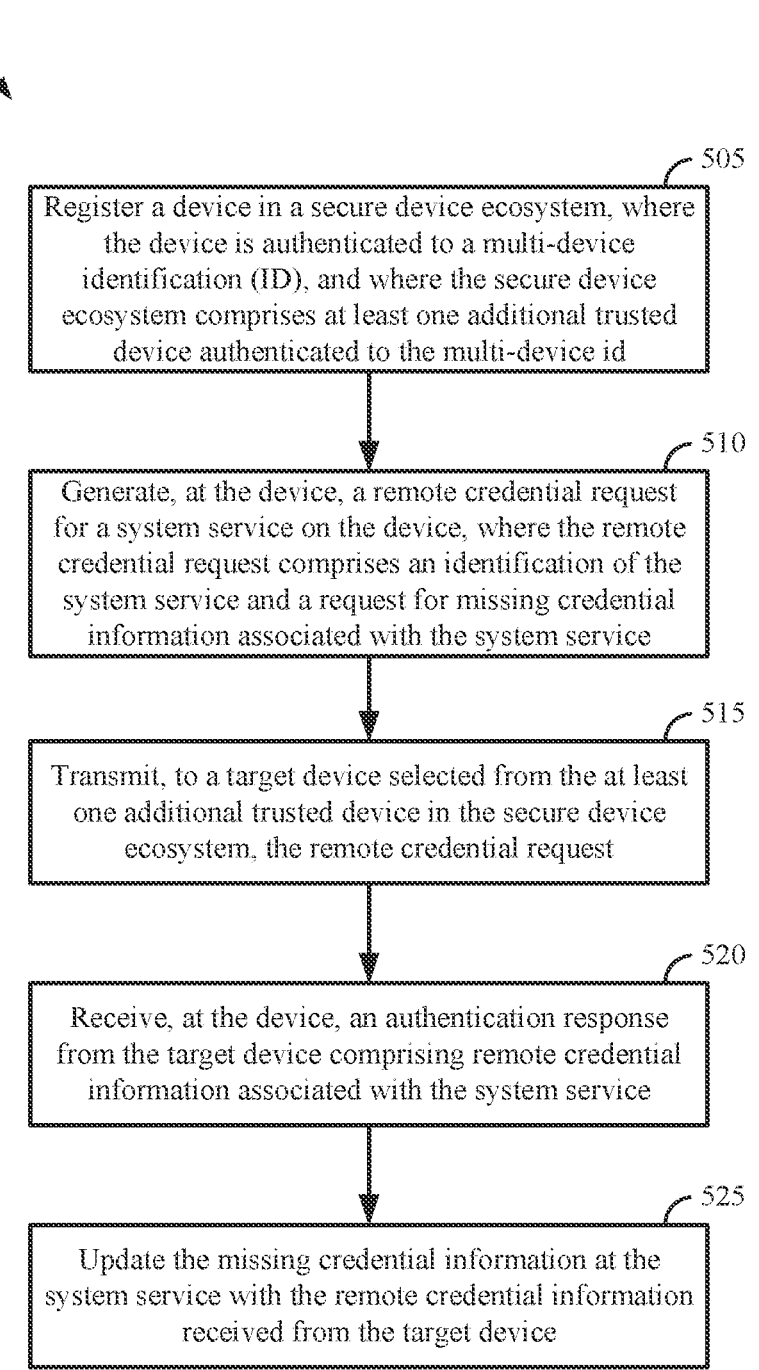

500

505
Register a device in a secure device ecosystem, where the device is authenticated to a multi-device identification (ID), and where the secure device ecosystem comprises at least one additional trusted device authenticated to the multi-device id 510
Generate, at the device, a remote credential request for a system service on the device, where the remote credential request comprises an identification of the system service and a request for missing credential information associated with the system service 515
Transmit, to a target device selected from the at least one additional trusted device in the secure device ecosystem, the remote credential request 520
Receive, at the device, an authentication response from the target device comprising remote credential information associated with the system service 525
Update the missing credential information at the system service with the remote credential information received from the target device

*Figure 5*

REMOTE AUTHENTICATION CREDENTIAL EXCHANGE

TECHNICAL FIELD

This disclosure relates generally to secure wireless communication, and more specifically, to remote authentication credential exchange between electronic devices in a wireless network.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, some STAs may communicate via secure communication links and secure transmissions. While these secure communication links provide for a wide range of secure communications, providing authentication credentials between STAs in a WLAN remains a challenge.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for remote authentication credential exchange. The method includes registering a device in a secure device ecosystem, where the device is authenticated to a multi-device identification (ID), and where the secure device ecosystem includes at least one additional trusted device authenticated to the multi-device ID, generating, at the device, a remote credential request for a system service on the device, where the remote credential request includes an identification of the system service and a request for missing credential information associated with the system service, and transmitting, to a target device selected from the at least one additional trusted device in the secure device ecosystem, the remote credential request. The method also includes receiving, at the device, an authentication response from the target device including remote credential information associated with the system service and updating the missing credential information at the system service with the remote credential information received from the target device.

In some examples, registering the device in the secure device ecosystem further includes initiating a remote authentication service module on the device, selecting, during an initiation process for the device and via the remote authentication service module, the target device from the at least one additional trusted device in the secure device ecosystem, where the target device is able to provide a manually entered remote credential to the device, and transmitting a trusted device notification to the target device to cause the target device to initiate a remote credential module for the device.

In some examples, the remote authentication service module on the device communicates with the remote credential module on the target device using encrypted messages, where the authentication response includes an encrypted message received from the target device, and where the method further includes decrypting, at the remote authentication service module, the authentication response to parse the remote credential information from the encrypted message.

In some examples, the system service includes a device access service, where the missing credential information for the device access service includes a manually entered password credential, and where transmitting the remote credential request causes the remote credential module on the target device to display a visual request for a password credential for the system service on a graphical interface of the target device.

In some examples, the method further includes receiving, from the device access service, a password error message at the remote authentication service module, transmitting, from the remote authentication service module to the remote credential module, an error authentication request indicating an error in a previously provided password credential, receiving, at the remote authentication service module, an updated authentication response from the target device including at least an updated password credential, and updating the device access service using the updated password credential.

In some examples, the device includes a biometric credential sensor for receiving biometric information, where the system service includes a biometric credential enrollment service to receive biometric credential information for authentication services on the device via the biometric credential sensor, and where the missing credential information includes the biometric credential information for the authentication services.

In some examples, registering the device in the secure device ecosystem further includes selecting, during an enrollment process at the biometric credential enrollment service, the target device from the at least one additional trusted device in the secure device ecosystem, where the target device includes stored biometric credential information, where the stored biometric credential information is compatible with the biometric credential sensor of the device.

In some examples, the remote credential request further includes an identification of sensor properties of the biometric credential sensor at the device, where the remote credential information includes remote biometric credential information stored on the target device, and where the authentication response further includes a verification of a compatibility of the remote biometric credential information with the sensor properties, indicating the target device performed a verification of the compatibility of the remote biometric credential information and the biometric credential sensor at the device.

Another innovative aspect of the subject matter described in this disclosure can be implemented in a wireless station for remote authentication credential exchange. The wireless station device includes a processing system that includes one or more processors and one or more memories coupled with the one or more processors, the processing system configured to cause the wireless station to: register a wireless station in a secure device ecosystem, where the wireless station is authenticated to a multi-device identification (ID), and where the secure device ecosystem includes at least one additional trusted device authenticated to the multi-device ID, generate, at the wireless station, a remote credential request for a system service on the wireless station, where the remote credential request includes an identification of the system service and a request for missing credential information associated with the system service, transmit, to a target device selected from the at least one additional trusted device in the secure device ecosystem, the remote credential request, receive, at the wireless station, an authentication response from the target device including remote credential information associated with the system service, and update the missing credential information at the system service with the remote credential information received from the target device.

In some examples, registering the wireless station in the secure device ecosystem further includes: initiating a remote authentication service module on the wireless station, selecting, during an initiation process for the wireless station and via the remote authentication service module, the target device from the at least one additional trusted device in the secure device ecosystem, where the target device is able to provide a manually entered remote credential to the wireless station, and transmitting a trusted device notification to the target device to cause the target device to initiate a remote credential module for the wireless station.

In some examples, the system service includes a device access service, where the missing credential information for the device access service includes a manually entered password credential, and where transmitting the remote credential request causes the remote credential module on the target device to display a visual request for a password credential for the system service on a graphical interface of the target device.

In some examples, the wireless station includes a biometric credential sensor for receiving biometric information, where the system service includes a biometric credential enrollment service to receive biometric credential information for authentication services on the wireless station via the biometric credential sensor, and where the missing credential information includes the biometric credential information for the authentication services.

In some examples, registering the wireless station in the secure device ecosystem further includes: selecting, during an enrollment process at the biometric credential enrollment service, the target device from the at least one additional trusted device in the secure device ecosystem, where the target device includes stored biometric credential information, where the stored biometric credential information is compatible with the biometric credential sensor of the wireless station.

Another innovative aspect of the subject matter described in this disclosure can be implemented in a wireless station for remote authentication credential exchange. The wireless station communication device includes a processing system that includes one or more processors and one or more memories coupled with the one or more processors, the processing system configured to cause the wireless station to: receive a remote credential request from a first device in a secure device ecosystem, where the wireless station and the first device are authenticated to a multi-device identification (ID), where the remote credential request includes an identification of a system service at the first device and a request for missing credential information associated with the system service at the first device, generate an authentication response including the remote credential information associated with the system service at the system service, and transmit the authentication response to the first device in the secure device ecosystem.

In some examples, the system service includes a device access service, where the missing credential information for the device access service includes a manually entered password credential, and where the processing system is configured to cause the wireless station to: display a visual request for a password credential for the system service on a graphical interface of the wireless station.

In some examples, the first device includes a biometric credential sensor for receiving biometric information, where the system service includes a biometric credential enrollment service to receive biometric credential information for authentication services on the first device via the biometric credential sensor, where the missing credential information includes the biometric credential information for the authentication services, where the remote credential request further includes an identification of sensor properties of the biometric credential sensor at the first device, where the remote credential information includes remote biometric credential information stored on the wireless station, and where the processing system is configured to cause the wireless station to: verify a compatibility of the remote biometric credential information stored on the wireless station and the biometric credential sensor at the first device, where the authentication response further includes a verification of a compatibility of the remote biometric credential information with the sensor properties.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5 shows a flowchart illustrating an example process performable by or at a wireless STA that supports remote authentication credential exchange.

Like reference numbers and designations in the various drawings indicate like elements.

DETAILED DESCRIPTION

Figure 1:
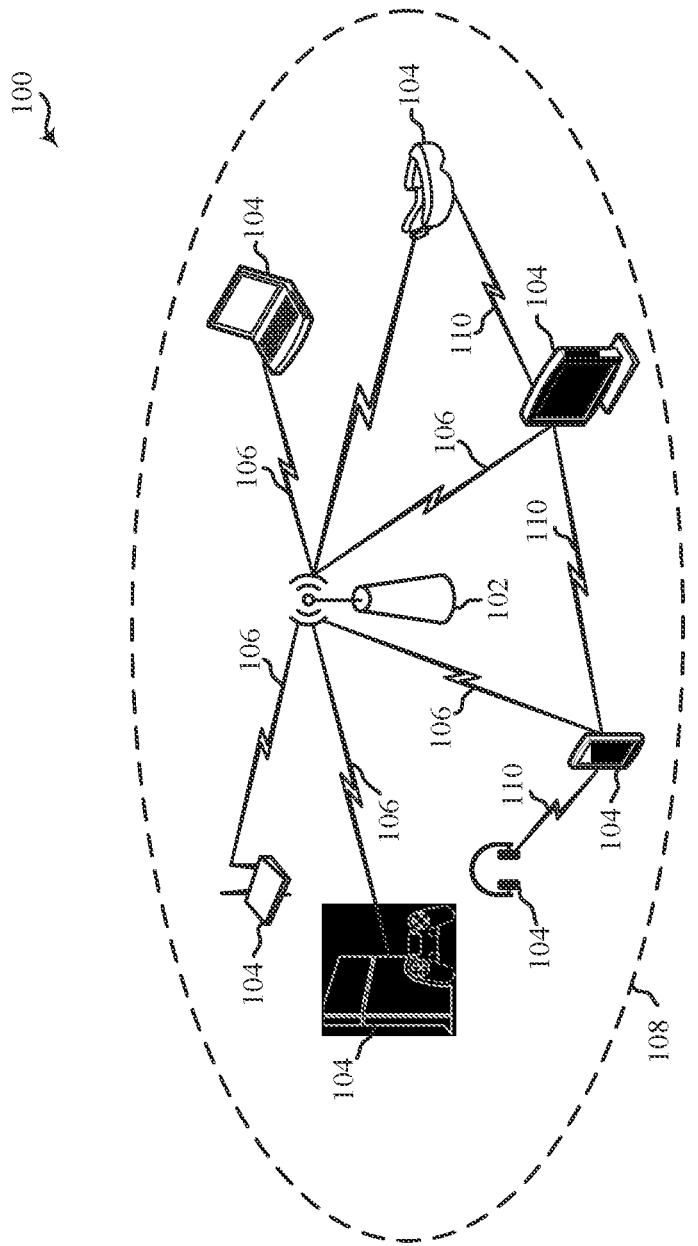
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the $3^{rd}$ Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IOT) network.

Various aspects relate to remote authentication information exchange for a system service in a secure device ecosystem and, more particularly to communicating with a trusted device in a secure device ecosystem to enable authentication information or credentials to be provided to the system service via the trusted device. Some aspects relate to a first or primary device in the secure device ecosystem registering into or joining the secure device ecosystem, which includes one or more trusted devices that may be utilized in a remote authentication credential exchange process. In some aspects, the primary device selects a target device from among the trusted devices and the target device may then serve as an alternate input device for a password associated with a locked system service, such as a device access service on the primary device. In some additional aspects, the primary device also may request stored authentication information, such as stored biometric credential information, from the target device for use on the primary device. The primary device also may generate and transmit a remote credential request to the trusted device in order to receive a manually inputted password credential or stored credential information, such as the biometric credential information. In some aspects, the remote credential includes an identification of the system service and request for missing credential information associated with the system service. The target device may then solicit the requested credential information from a user or other password entity or access stored credential information associated with the request. The target device also provides an authentication response, including a remote credential information for the system service, to the primary device. The primary device, upon receiving the remote credential information from the target device, updates the missing credential information using the remote credential information.

Particular aspects of the subject matter described in this disclosure can be implemented to realize one or more of the following potential advantages. The present disclosure provides for alternate or backup methods to provide authentication credentials, including passwords and stored biometric credentials, between authenticated devices on a secure network. For example, an unlock or device access system service on an electronic device may not allow for device access when a user interface or other password entry system associated with locked systems services are malfunctioning or otherwise inoperable. Some system services, including various security services on electronic devices, require manually entered passwords after the device or service reboots. By providing alternate password input options via remote credential exchange, a user is able to securely unlock a locked system service on the electronic device that would otherwise stay locked when the user interface on the electronic device is disabled. This alternate password input option increases the options for a user to securely access and utilize the electronic device that may otherwise require other advanced interventions such as consulting a device repair or access specialist.

In another example, a user may sign into an electronic device using a multi-device identification. The electronic device may include various biometric sensors, such as fingerprint or visual recognition sensors, which typically require a user to manually add new biometric information on each new device, even when the user may have previously enrolled on a different device. In some examples, the user experience and setup of an electronic device can be delayed and complicated by the input and verification of biometric information on a new device during an enrollment process on the electronic device. To avoid this delay, some users may skip or otherwise delay the biometric information step during an initial device setup, which can leave the device and system services on the device less secure. By providing access to previously stored biometric credentials via remote credential exchange, a user is able to securely update the electronic device with compatible biometric credential information without having to repeat an enrollment process. Additionally, by utilizing a trusted device in a secure device ecosystem for remote authentication credential exchange, the security of the electronic device and the security of the various system services on the electronic device are not compromised, while also providing access to the needed credential information on the electronic device. Providing access to the previously stored biometric credentials allows for a user to avoid the complication and delay of the biometric enrollment process while also providing the advanced security of biometric credentials on a new device. The user is thus able to quickly and securely access and use a new device with biometric credentials without the delay of repeating a biometric enrollment process.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHZ, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHZ, 6 GHZ, 45 GHZ, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125

GHZ-24.25 GHz), FR4a or FR4-1 (52.6 GHz-71 GHz), FR4 (52.6 GHz-114.25 GHz), and FR5 (114.25 GHZ-300 GHz).

Each of the frequency bands may include multiple subbands and frequency channels (also referred to as subchannels). The terms "channel" and "subchannel" may be used interchangeably herein, as each may refer to a portion of frequency spectrum within a frequency band (for example, a 20 MHz, 40 MHz, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHZ, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (for example, for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (for example, UHR- or IEEE 802.11bn-compatible) devices for opportunistic access to spectrum that may be otherwise under-utilized.

Figure 2:
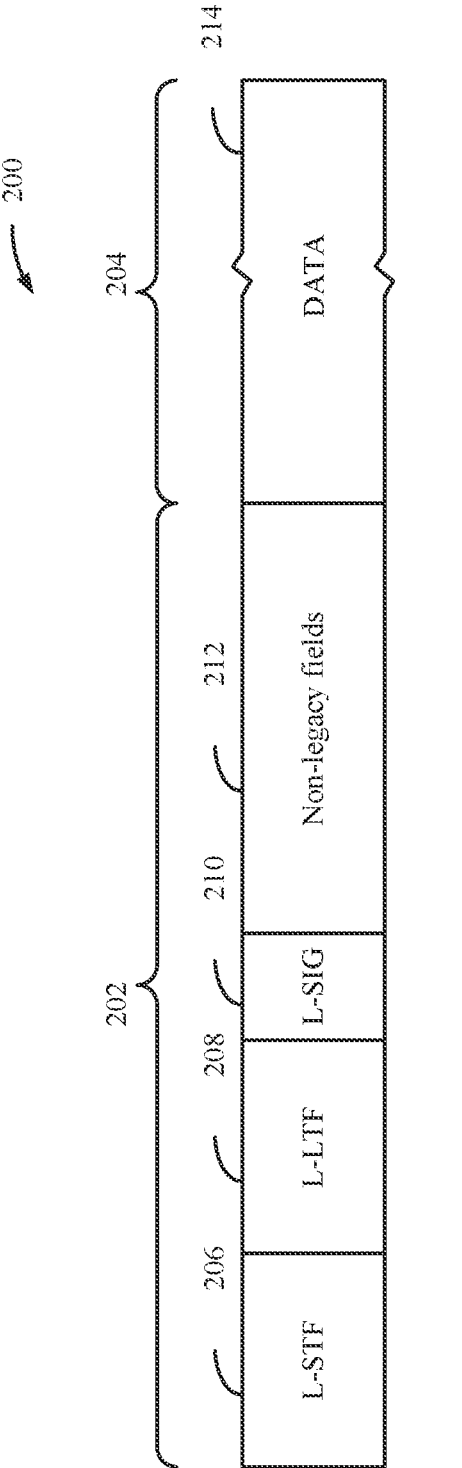
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (for example, by generating a message integrity check (MIC) for one or more relevant fields).

Figure 3:
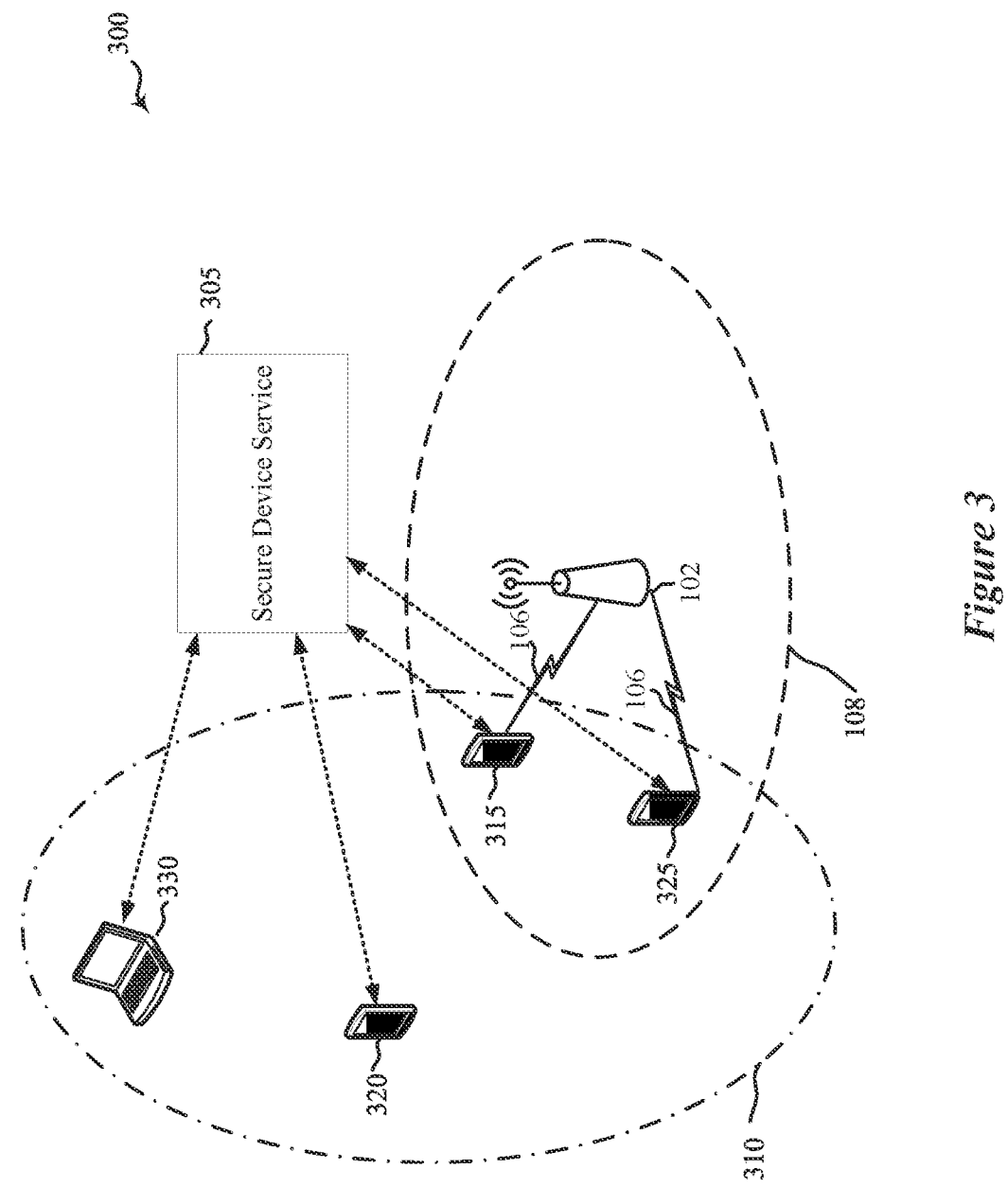
FIG. 3 shows a pictorial diagram of an example secure device ecosystem.

FIG. 3 shows a pictorial diagram of an example secure device ecosystem 300. In some examples, the secure device ecosystem 300 includes secure devices or STAs such as trusted devices 310, which includes secure stations such as STA 315, STA 320, STA 325 and STA 330. In some examples, the STAs 315-330 are similar to the STAs 104. For example, the STAs 315 and 325 may be located in the coverage area 108 and communicate with the AP 102 via communication links 106 as described in further detail in reference to FIG. 1. In some examples, the trusted devices 310 also may include devices outside of a coverage area 108 such as the STA 320 and 330. For example, the STA 320 and 330 may communicate with the secure device service 305 via another wireless network, such as a Wi-Fi, cellular, IT or other wireless network. In some examples, the STAs 315-330 also may communicate via communication links 110 also described with reference to FIG. 1. In some examples, communications between the STAs 315-330 and the AP 102, secure device service 305 or directly between respective STAs include secure or encrypted communications in the secure device ecosystem 300. For example, the STAs may communicate using secured wireless communication utilizing a security key and encrypted PDU 200 as described in reference to FIG. 2.

In some examples, the STAs 315-330 are authenticated to a multi-device identification service and registered to secure device service 305 and include a unique identification installed on a respective STA indicating the STA is associated with other devices, including other device in the secure device ecosystem 300. In some examples, the secure device service 305 is executed on a network device such as a server, AP, such as the AP 102, or other network device in communication with the STAs 315-330. For example, an independent service or ecosystem controller may authenticate a device, enroll the device in a multi-device identification service, and install an ID on the device as shown in more detail in reference to FIG. 4.

In some examples, the secure STAs in the secure device ecosystem 300 may utilize secure communications in the secure device ecosystem 300 to perform a remote authentication credential exchange. In some implementations, the STA 315 registers as a device in the secure device ecosystem during an enrollment or authentication process with the secure device service 305. In some examples, upon authentication to a multi-device identification (ID) and enrollment in the secure device ecosystem 300 the STA 315 generates a remote credential request for a system service on the device and transmits the remote credential request, to a target device, such as any of the STAs 320-330 in the trusted devices 310 of the secure device ecosystem 300. In some examples, the STA 315 receives an authentication response from the target device which includes remote credential information associated with the system service and updates the missing credential information at the system service with the remote credential information received from the target device as shown in more detail in reference to FIGS. 4-9.

Figure 4:
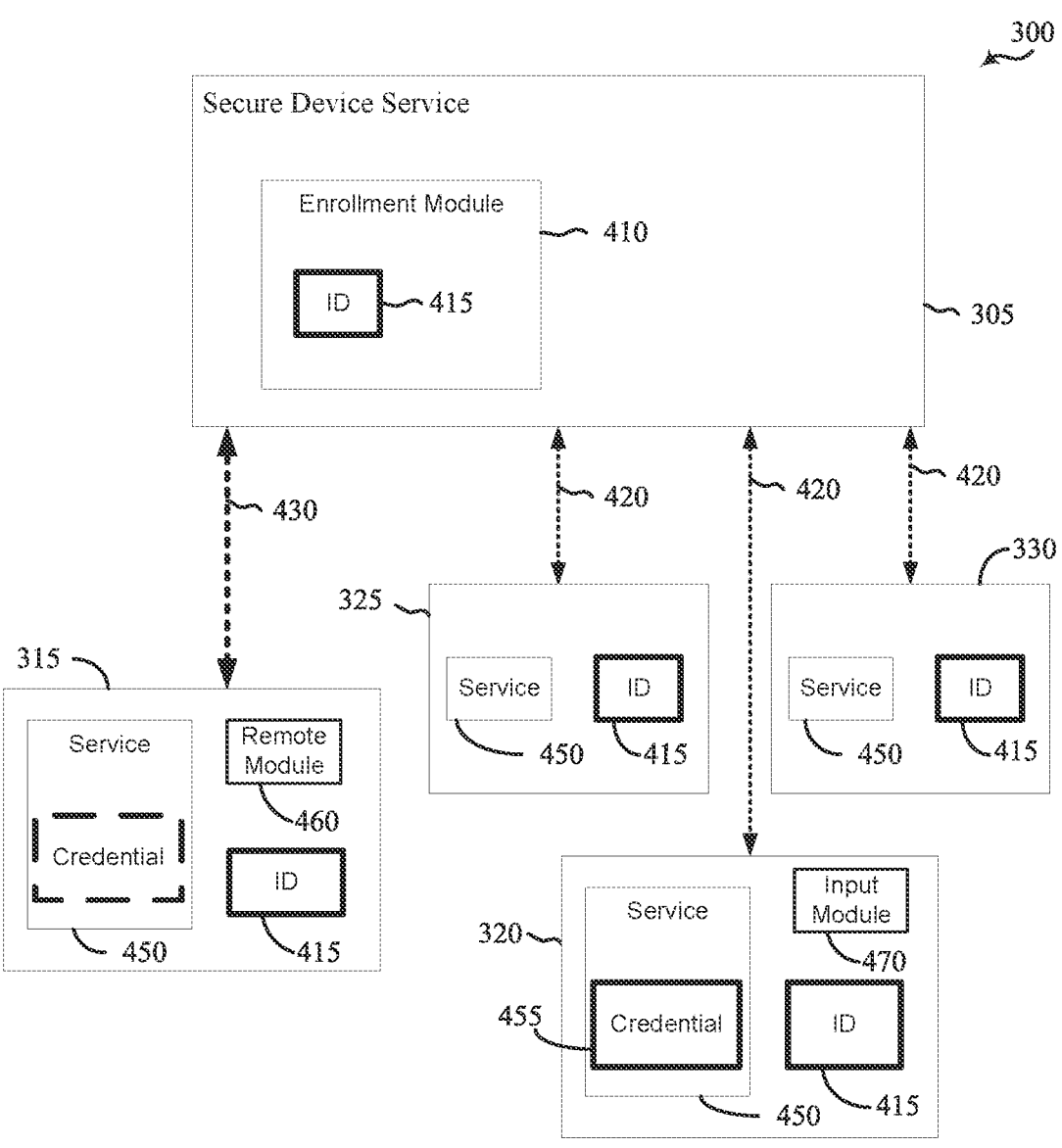
FIG. 4 shows a pictorial diagram of example trusted devices in an example secure device ecosystem.

FIG. 4 shows a pictorial diagram of example trusted devices in an example secure device ecosystem 300. In some examples, the secure device service 305 includes an enrollment module 410 which provides authentication and multi-device ID installation/distribution services to the secure device ecosystem 300. For example, the STA 320, STA 325 and STA 330 may be previously registered in the secure device ecosystem 300 and with the secure device service 305 such that a multi-device ID 415 is installed on each of the STA 320, STA 325 and STA 330. In some examples, the multi-device ID 415 indicates the STAs are authenticated with the secure device service 305 and may serve as a trusted device in the secure device ecosystem 300. In some examples, the STA 320, STA 325 and STA 330 maintain connections 420 to aid in multi-device ID maintenance and reverification, as well as other control and communication services related to the secure device ecosystem 300.

In some examples, the STA 315 may register with the secure device service 305 as a secure or trusted device using an enrollment process 430. The enrollment process 430 may occur during the initiation or start-up of a device. For example, the first time the STA 315 is turned on or registers a new service or application on the device, the STA 315 initiates the enrollment process 430 to enroll the STA 315 in the secure device ecosystem 300 and with the secure device service 305.

In some examples, the STA 315 also initiates a remote authentication service module 460 and selects a target device from the at least one additional trusted device in the secure device ecosystem using the remote authentication service module 460. In some examples, the STA 315 and the STA 320, STA 325 and STA 330 each have an instance of a system service 450 executing on the individual devices. In some examples, the system service 450 may utilize credentials such as passwords or biometric credentials to lock or unlock the various services or provide access to applications/services using the biometric credentials.

In some examples, the STA 315 selects a target device from among the trusted devices and the target device may then serve as an alternate input device for a password associated with a locked system service, such as when the system service 450 is a device access service on the STA 315. For example, the STA 320 may include a user interface (UI) or other interface mechanisms which provides for a user to enter a manual password to unlock the system service 450 on the STA 315.

In some examples, the STA 315 also may request stored authentication information, such as stored biometric credential information, from the target device for use on the STA 315. For example, as shown in FIG. 4, the system service 450 may be missing a credential and request a stored credential 455 stored at the system service 450 on the STA 320. In some examples, the remote authentication service module 460 selects a target device, such as the STA 320, based on compatibility of the target device with the system service 450. For example, the remote authentication service module 460 may select the STA 320 when the STA 320 includes a UI which allows for a manual password to be entered and provided to the STA 315 via the STA 320. In some examples, the remote authentication service module 460 selects the STA 320 based on compatibility of sensors of the STA 315 and the STA 320 and the suitability of the stored credential 455 to be used by the STA 315.

The STA 315 also may generate and transmit a remote credential request to the trusted device in order to receive a manually inputted password credential or stored credential information, such as the biometric credential information. In some aspects, the remote credential includes an identification of the system service and request for missing credential information associated with the system service. The target device may then solicit the requested credential information from a user or other password entity or access stored credential information associated with the request. The target device also provides an authentication response, including a remote credential information for the system service, to the STA 315. The STA 315, upon receiving the remote credential information from the target device updates the missing credential information at the system service 450 using the remote credential information as described in more detail in relation to the operations depicted in FIGS. 5-8.

FIG. 5 shows a flowchart illustrating an example process 500 performable by or at a wireless STA that supports remote authentication credential exchange. The operations of the process 500 may be implemented by a wireless STA or its components as described herein. For example, the process 500 may be performed by a wireless communication device, such as the wireless STA 1000 described with reference to FIG. 10, operating as or within a wireless STA. In some examples, the process 500 may be performed by a wireless STA such as one of the STAs 104 described with reference to FIG. 1 or by the STA 315 described in reference to FIGS. 3 and 4. Further details of the operations of the process 500 are also described in relation to the operations and examples described in reference to FIGS. 6-9.

At block 505, the wireless STA registers a device in a secure device ecosystem, where the wireless STA is authenticated to a multi-device ID. In some examples the secure device ecosystem includes at least one additional trusted device authenticated to the multi-device ID. For example, the STA 315 may include the multi-device ID 415 and be authenticated to the secure device service 305 of the secure device ecosystem 300 as described in reference to FIG. 3. In some examples, the secure device ecosystem 300 includes the trusted devices 310 which are also authenticated to the secure device service 305 and include the multi-device ID 415.

In some implementations, registering the wireless STA in the secure device ecosystem also may include initiating a remote authentication service module on the wireless STA and selecting, during an initiation process for the wireless STA and via the remote authentication service module, a target device from the at least one additional trusted device in the secure device ecosystem. In some examples, the selection of the target device is based on an ability to provide a manually entered remote credential to the wireless STA. In some examples, registering the wireless STA also may further include transmitting a trusted device notification to the target device to cause the target device to initiate a remote credential module for the wireless STA as described in more detail in reference to FIGS. 6 and 7.

In some implementations, registering the wireless STA in the secure device ecosystem also may include selecting a target device from the at least one additional trusted device in the secure device ecosystem based on stored biometric credential information. For example, the target device may include stored biometric credential information associated with a biometric credential service, where the stored biometric credential information is compatible with the biometric credential sensor of the wireless STA as described in reference to FIGS. 8 and 9.

At block 510, the wireless STA generates a remote credential request for a system service on the wireless STA, where the remote credential request includes an identification of the system service and a request for missing credential information associated with the system service. In some implementations, the system service is a device access service. For example, the device access service may lock or prevent user access to a client device or STA until an access credential, such as a password, is provided to the device access service. In some examples, data and applications stored on the wireless STA are in an encrypted state when the device access service is in a locked state, and the device access service enters the locked state upon a power reboot of the wireless STA. In some examples, the device access service may require a manually entered credential in order to enter an unlocked state. In some examples, a user interface associated with the device access service on the STA 315 may be disabled or damaged such that a direct manual input of a password credential at the wireless STA is not possible via the user interface of the STA 315. In this example, the missing credential information for the device access service is a manually entered password credential.

In some implementations, the STA 315, may display, via a user interface of the wireless STA, a request to access remote biometric credential information from the target device and receive a confirmation to bypass a current biometric credential enrollment on the wireless STA and request the remote biometric credential information. In some examples, the remote credential request includes an identification of sensor properties of the biometric credential sensor at the wireless STA, to provide for a verification of a compatibility of the remote biometric credential information at the target device with the sensor properties.

At block 515, the wireless STA transmits, to the target device selected from the at least one additional trusted device in the secure device ecosystem, the remote credential request. In some implementations, transmitting the remote credential request causes the remote credential module on the target device to display a visual request for a password credential for the system service on a graphical interface of the target device as described in more detail in reference to FIGS. 6 and 7. In some implementations, transmitting the remote credential request with an identification of sensor properties of the biometric credential sensor at the wireless STA causes the target device to perform a verification of the compatibility of the remote biometric credential information stored on the target device and the biometric credential sensor at the STA 315.

At block 520, the wireless STA receives an authentication response from the target device which includes remote credential information associated with the system service. In some examples, the authentication response may include encrypted information, where the wireless STA decrypts, at the remote authentication service module, the authentication response to parse the remote credential information from the encrypted message. In some implementations, the STA 315 also may verify the remote credential information received from the target device is compatible with sensor properties of the biometric credential sensor at STA 315 as described in reference to FIGS. 8 and 9.

At block 525, the wireless STA updates the missing credential information at the system service with the remote credential information received from the target device. In some examples, the remote credential information is verified with the system service, such as the device access service. In an example where the remote credential information is incorrect, the STA 315 may generate subsequent remote credential requests and transmit the subsequent requests to the target device until a correct authentication response is received and verified at the system service. In some implementations, the STA 315 alters the plurality of biometric templates using a hardware compensation factor to generate a plurality of device compatible biometric templates and updates the missing credential information at the biometric enrollment service with the plurality of device compatible biometric templates.

Figure 6:
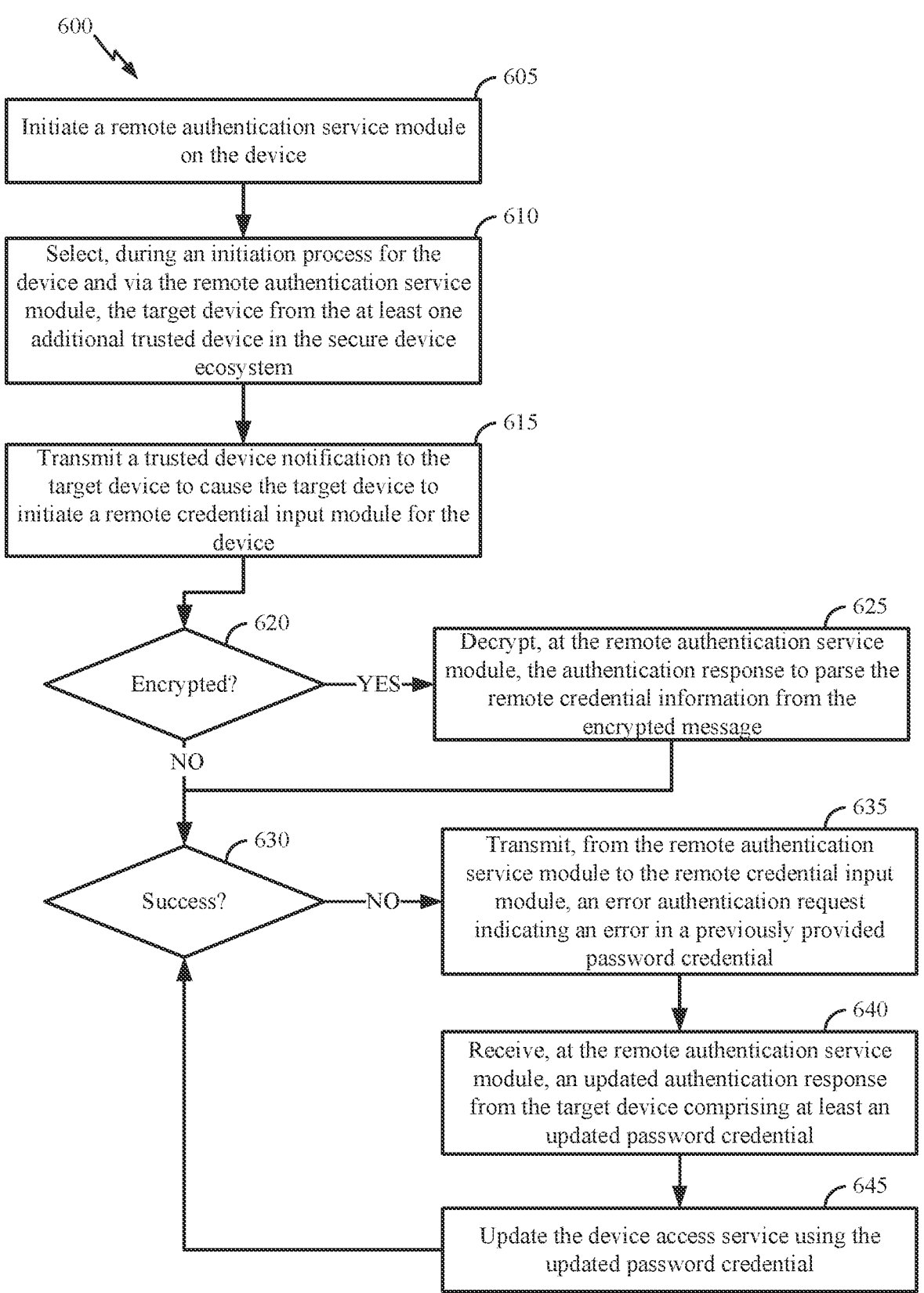
FIG. 6 shows a flowchart illustrating an example process performable by or at a wireless STA that supports remote authentication credential exchange.

FIG. 6 shows a flowchart illustrating an example process 600 performable by or at a wireless STA that supports remote authentication credential exchange. In some examples, the process 600 is an example process for a remote credential exchange for a locked system service. The operations of the process 600 may be implemented by a wireless STA or its components as described herein. For example, the process 600 may be performed by a wireless communication device, such as the wireless STA 1000 described with reference to FIG. 10, operating as or within a wireless STA. In some examples, the process 600 may be performed by a wireless STA such as one of the STAs 104 described with reference to FIG. 1 or by the STA 315 described in reference to FIGS. 3 and 4. Further details of the operations of the process 600 are also described in relation to the operations and examples described in reference to FIG. 7.

In some examples, the system service 450 on the STA 315 is a device access service or an unlock system service. In some examples, the system service 450 does not allow for device access to a user when the system is in a locked status. In some examples, the system service 450 may further prevent device or service access when a user interface or other password entry system associated with locked systems services are malfunctioning or otherwise inoperable. Additionally, the system service 450 may require manually entered passwords after the device or system service reboots. By providing alternate password input options via remote credential exchange, a user is able to securely unlock a locked system service on the electronic device that would otherwise stay locked when the user interface on the electronic device is disabled. The alternate password input option described in the process 600 increases available options for a user to securely access and utilize the electronic device that may otherwise require other advanced interventions such as consulting a device repair or access specialist.

At block 605, the wireless STA initiates a remote authentication service module on the device. In some examples, during the registration of the STA 315 in the secure device ecosystem 300, such as described in block 505, the STA 315 initiates the remote authentication service module 460 on the STA 315.

At block 610, the wireless STA selects, during an initiation process for the device and via the remote authentication service module, the target device from the at least one additional trusted device in the secure device ecosystem, where the target device is able to provide a manually entered remote credential to the device.

At block 615, the wireless STA transmits a trusted device notification to the target device to cause the target device to initiate a remote credential module for the device.

At block 620, the wireless STA determines from the received authentication response whether the authentication response or other information in message is encrypted. In some examples, the remote authentication service module 460 on the STA 315 communicates with the remote credential module 470 using encrypted messages such that messages received at block 620 from the STA 320 are encrypted. In this example, the process 600 proceeds to block 625.

At block 625, the wireless STA decrypts, at the remote authentication service module, the authentication response to parse the remote credential information from the encrypted message. For example, the remote authentication service module 460 may utilize a security key or other encryption/decryption standard to decrypt the communications received from the STA 320 and extract the remote credential or password from the message.

At block 630, the wireless STA receives a return message from the system service after providing the remote credential information in block 525 of FIG. 5 and determines whether the return message indicates the credential successfully updated the system service. For example, an error message, such as a password error message from the device access service, received at the remote authentication service module indicates the password received is incorrect. When the system service 450 indicates an error in the remote credential information, the process 600 proceeds to block 635.

At block 635, the wireless STA transmits, from the remote authentication service module to the remote credential input module, an error authentication request indicating an error in a previously provided password credential. In some examples, the STA 320 then requests that a user resubmit a password or other credential information via the user interface at the STA 320.

At block 640, the wireless STA receives, at the remote authentication service module, an updated authentication response from the target device including at least an updated password credential and at block 645, the wireless STA updates the device access service using the updated password credential. In this example, the process 600 proceeds back to block 630 to determine whether a return message from the system service indicates a successful credential update or whether the process 600 should return to block 635 to reattempt the remote credential exchange.

Figure 7:
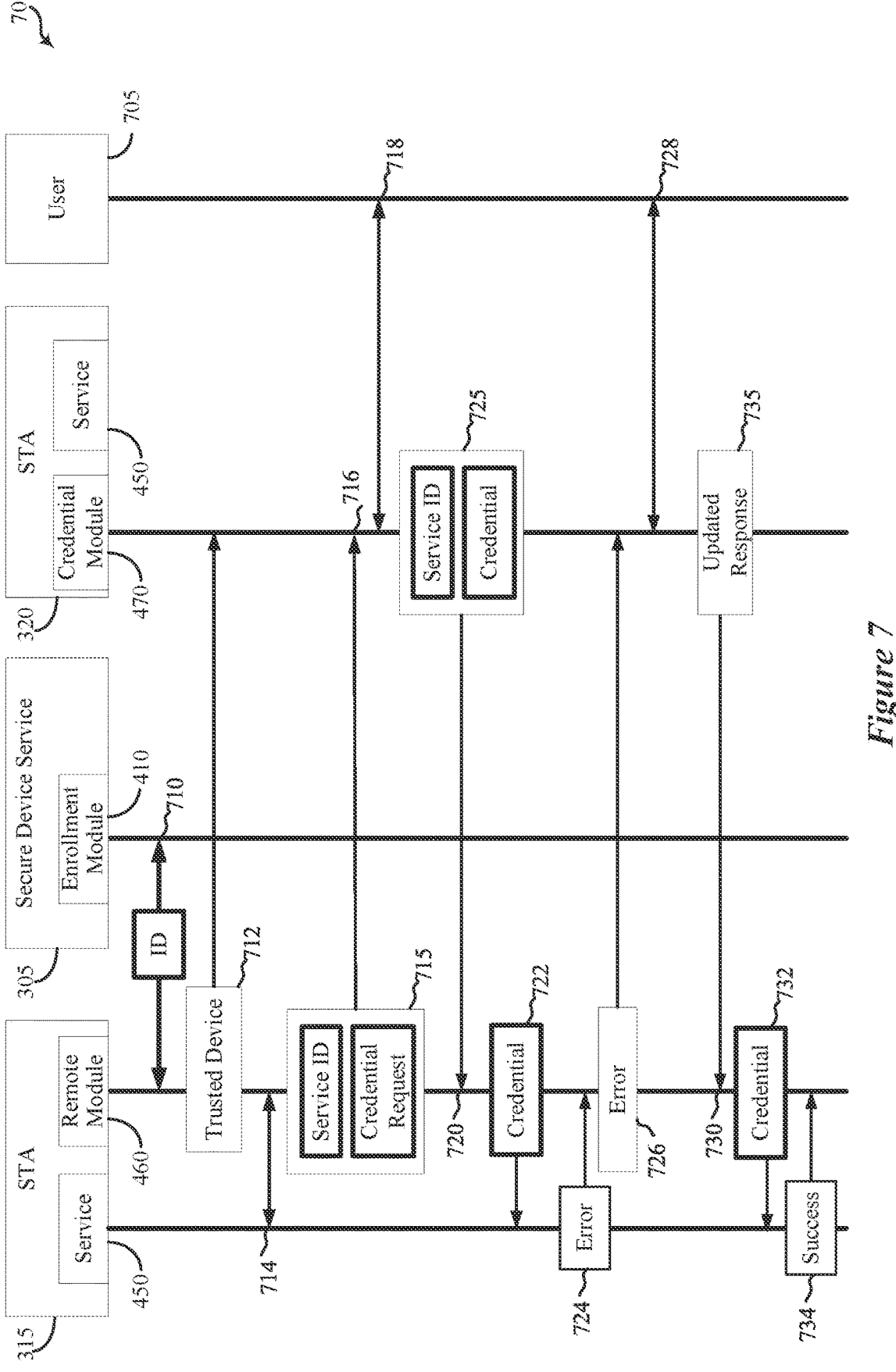
FIG. 7 shows a system flow diagram illustrating an example process that supports remote authentication credential exchange.

FIG. 7 shows a system flow diagram illustrating an example process 700 that supports remote authentication credential exchange. In some examples, the process 700 is an example process for a remote credential exchange for a locked system service. The operations of the process 700 may be implemented by a wireless STA or its components as described herein. For example, the process 700 may be performed by a wireless communication device, such as the wireless STA 1000 described with reference to FIG. 10, operating as or within a wireless STA. In some examples, the process 700 may be performed by a wireless STA such as one of the STAs 104 described with reference to FIG. 1 or by the STA 315 described in reference to FIGS. 3 and 4. Further details of the operations of the process 700 are also described in relation to the operations and examples described in reference to FIGS. 5 and 6.

In some examples, the system service 450 on the STA 315 is a device access service or an unlock system service. In some examples, the system service 450 does not allow for device access to a user when the system is in a locked status. For example, data and applications stored on the STA 315 are in an encrypted state when the device access service is in a locked state, and the device access service enters the locked state upon a power reboot of the STA 315. In some examples, the system service 450 may further prevent device or service access when a user interface or other password entry system associated with locked systems services are malfunctioning or otherwise inoperable. Additionally, the system service 450 may require manually entered passwords after the device or system service reboots. By providing alternate password input options via remote credential exchange, a user is able to securely unlock a locked system service on the electronic device that would otherwise stay locked when the user interface on the electronic device is disabled. The alternate password input option described in the process 700 increases available options for a user to securely access and utilize the electronic device that may otherwise require other advanced interventions such as consulting a device repair or access specialist.

At time 710, the STA 315 registers as a device in the secure device ecosystem 300. In some examples, the process at time 710 includes authenticating and installing the multi-device ID 415 from the secure device service 305 and the enrollment module 410, as described in reference to FIGS. 3 and 4. In some examples, the secure device ecosystem 300 includes at least one additional trusted device authenticated to the multi-device ID, such as the trusted devices 310.

At time 710, the STA 315 also may initiate the remote authentication service module 460 and select the target device, such as the STA 320 from the at least one additional trusted device in the secure device ecosystem. In some examples, the selection of STA 320 as the target device is based on the ability of the STA 320 to provide a manually entered remote credential to the STA 315.

At time 712, the STA 315 transmits a trusted device notification to the STA 320 to cause the target device to initiate the remote credential module 470 for the communication with the STA 315 and to interact with a user 705.

At time 714, the remote authentication service module 460 receives a remote authentication interrupt from the system service 450. In some examples, the remote authentication interrupt indicates that a user interface for the system service 450 is disabled and may require an alternate manual input entry mode. For example, a user interface associated with the device access service on the STA 315 may be disabled due to damage or other errors which in turn prevents a direct manual input of a password credential at the STA 315.

In some examples at time 716, the STA 315 generates a remote credential request 715 in response to receiving the remote authentication interrupt and transmits the remote credential request to the STA 320. In some examples, the remote credential request 715 for the system service 450 includes an identification of the system service and a request for missing credential information associated with the system service. In some examples, the system service 450 is a device access service and the missing credential information for the device access service includes a manually entered password credential.

At time 718, the remote credential request received at the remote credential module 470 causes the remote credential module 470 to display a visual request for a password credential for the system service on a graphical interface of STA 320 to the user 705. In some examples, the user provides the password credential by typing a password into the graphical interface or using other manual means to provide a password to the STA 320. At time 720, the remote credential module 470 generates an authentication response 725 which includes remote credential information associated with the system service 450 as provided by the user 705 and transmits the authentication response 725 to the STA 315 and remote authentication service module 460.

At time 722, the remote authentication service module 460 determines from the received authentication response whether the authentication response or other information in message is encrypted. In some examples, the remote credential module 470 uses encrypted messages such that messages received from the STA 320 are encrypted. In this example, remote authentication service module 460 decrypts the authentication response to parse the remote credential information from the encrypted message. For example, the remote authentication service module 460 may utilize a security key or other encryption/decryption standard to decrypt the communications received from the STA 320 and extract the remote credential or password from the message. The remote authentication service module 460 also updates the missing credential information at the system service 450 with the decrypted remote credential information received from the target device.

In some examples, at time 724 the remote authentication service module 460 receives a password error message at from the system service 450 and transmits an error authentication request indicating an error in a previously provided password credential to the remote credential module 470 at time 726. At time 728, the error authentication request at the remote credential module 470 causes the remote credential module 470 on STA 320 to display a visual request for an updated password credential for the system service on a graphical interface of STA 320 to the user 705. In some examples, the user provides the updated password credential by typing a password into the graphical interface or using other manual means to provide a password to the STA 320.

At time 730, the remote credential module 470 generates an updated authentication response 735 which includes an updated password credential information associated with the system service 450 as provided by the user 705 and transmits the updated authentication response 735 to the STA 315 and remote authentication service module 460.

At time 732, the remote authentication service module 460 may parse and decrypt the updated authentication response 735 as needed and update the system service 450 using the updated password credential. In some examples, at time 734 the remote authentication service module 460 receives a password success message at from the system service 450 indicating the remote credential is valid and that the device access service is unlocked. For example, the data and applications stored on the STA 315 are now in an unlocked unencrypted state.

Figure 8:
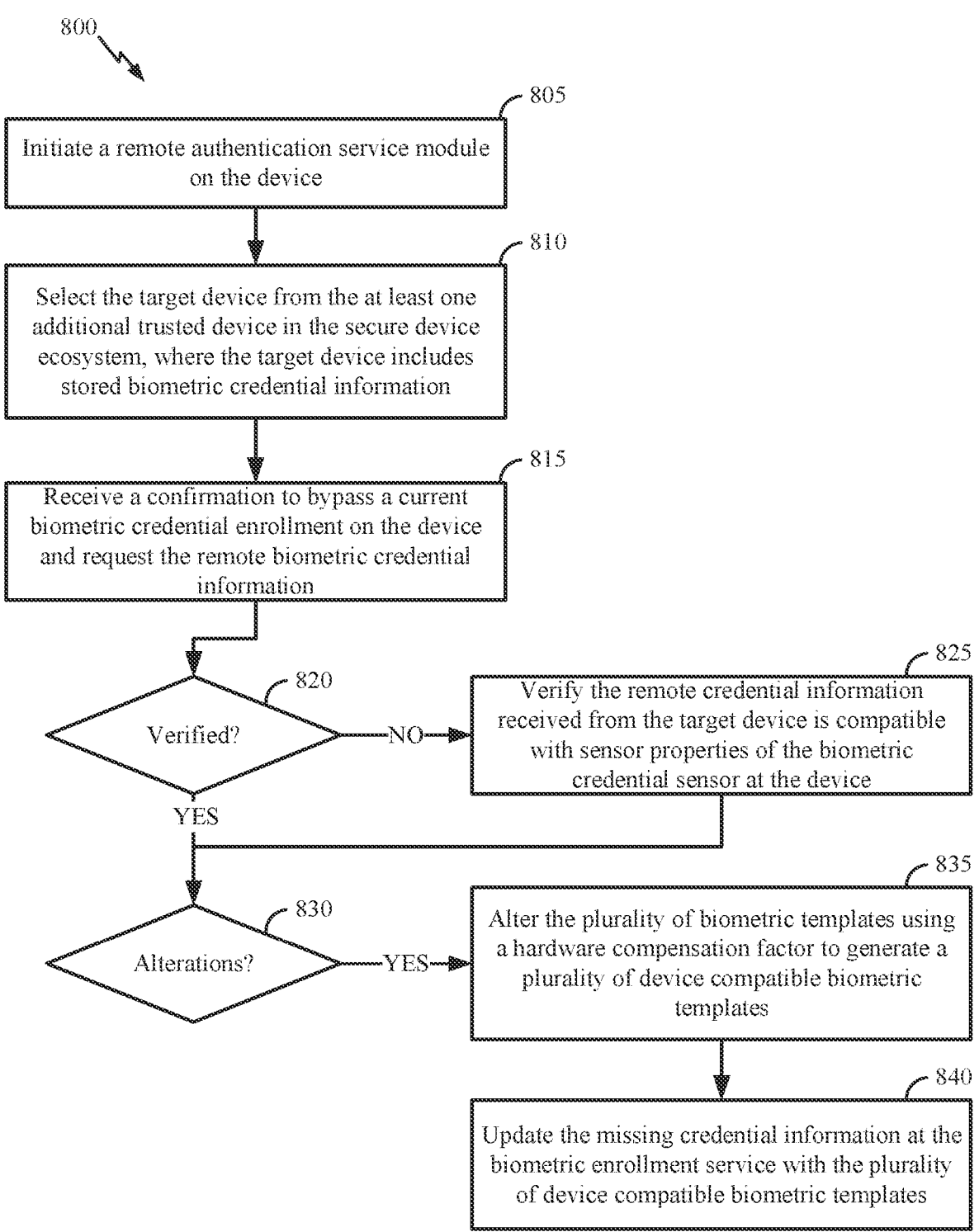
FIG. 8 shows a flowchart illustrating an example process performable by or at a wireless STA that supports remote authentication credential exchange.

FIG. 8 shows a flowchart illustrating an example process 800 performable by or at a wireless STA that supports remote authentication credential exchange. In some examples, the process 800 is an example process for a remote credential exchange for stored credential information including stored biometric credential information. The operations of the process 800 may be implemented by a wireless STA or its components as described herein. For example, the process 800 may be performed by a wireless communication device, such as the wireless STA 1000 described with reference to FIG. 10, operating as or within a wireless STA. In some examples, the process 800 may be performed by a wireless STA such as one of the STAs 104 described with reference to FIG. 1 or by the STA 315 described in reference to FIGS. 3 and 4. Further details of the operations of the process 800 are also described in relation to the operations and examples described in reference to FIG. 9.

In some examples, the system service on the device, such as the system service 450 on the STA 315 uses stored credential information to provide access to the system service and device. For example, a user may sign into an electronic device using the multi-device ID 415. The electronic device, such as the STA 315 may include various biometric sensors, such as fingerprint or visual recognition sensors, which typically require a user to manually add new biometric information on each new device, even when the user may have previously enrolled on a different device. For example, the STA 320 includes the previously stored credential 455. In some examples, the user experience and setup of a new electronic device can be delayed and complicated by the input and verification of biometric information on the new device during the enrollment or sign-in process on the electronic device. To avoid this delay, some users may skip or otherwise delay the biometric information step during an initial device setup, which can leave the device and system services on the device less secure. By providing access to previously stored biometric credentials on the STA 320 via remote credential exchange, the user is able to securely update the electronic device with compatible biometric credential information without having to repeat an enrollment process. Additionally, by utilizing a trusted device in a secure device ecosystem for remote authentication credential exchange as described in the process 800, the security of the electronic device and the security of the various system services on the electronic device are not compromised, while also providing access to the needed credential information on the electronic device.

At block 805, the wireless STA initiates a remote authentication service module on the device. In some examples, during the registration of the STA 315 in the secure device ecosystem 300, such as described in block 505, the STA 315 initiates the remote authentication service module 460 on the STA 315.

At block 810, the wireless STA selects, during an enrollment process at the biometric credential enrollment service the target device from the at least one additional trusted device in the secure device ecosystem, where the target device includes stored biometric credential information, and where the stored biometric credential information is compatible with the biometric credential sensor of the device. For example, during an enrollment process with the enrollment module 410 at the secure device service 305, the remote authentication service module 460 selects a target device from the trusted devices 310 to exchange remote credential information with based on the presence of the credential stored at the trusted device. For example, the STA 315 may select the STA 320 as the target device since the STA 320 includes the stored credential 455.

At block 815, the wireless STA displays, via a user interface of the device, a request to access remote biometric credential information from the target device and receives, via the user interface, a confirmation to bypass a current biometric credential enrollment on the device and request the remote biometric credential information. For example, the STA 315 may verify with an enrolling user utilizing the STA 315 that the current biometric enrollment process should be suspended and that stored biometric credentials, such as the stored credential 455 stored on the STA 320 should be access and utilized on the STA 315. Upon receiving confirmation to access the stored biometric credentials the wireless STA generates a remote credential request and transmits the remote credential request to the target device as described in blocks 510 and 515 of the process 500. In some examples, the remote credential request includes an identification of sensor properties of the biometric credential sensor at the wireless STA, such as the sensor properties of the STA 315.

At block 820 and upon receiving an authentication response from the target device the wireless STA determines whether the compatibility of the biometric credential is verified. In some examples, the authentication response may include a verification of a compatibility of the remote biometric credential information with the sensor properties included in the remote credential request, indicating the target device, such as the STA 320, performed a verification of the compatibility of the remote biometric credential information and the biometric credential sensor at the device. For example, the STA 320 may verify that the stored credential 455 is compatible with biometric sensors at the STA 320. In an example, where the biometric credential has not been verified by the target device the process 800 proceeds to block 825.

At block 825, the verified, the remote credential information received from the target device is compatible with sensor properties of the biometric credential sensor at the wireless STA.

At block 830, the wireless STA determines whether alterations are needed for the remote biometric credential information before use with the system service. For example, a fingerprint may be stored on the STA 320 may be utilized by the STA 315 as a biometric credential after applying compensation factors to adjust for different types of sensors, including different sensor sizes among other factors.

In block 835, the wireless STA alters a plurality of biometric templates using a hardware compensation factor to generate a plurality of device compatible biometric templates; and updates the missing credential information at the biometric enrollment service with the plurality of device compatible biometric templates in block 840.

Figure 9:
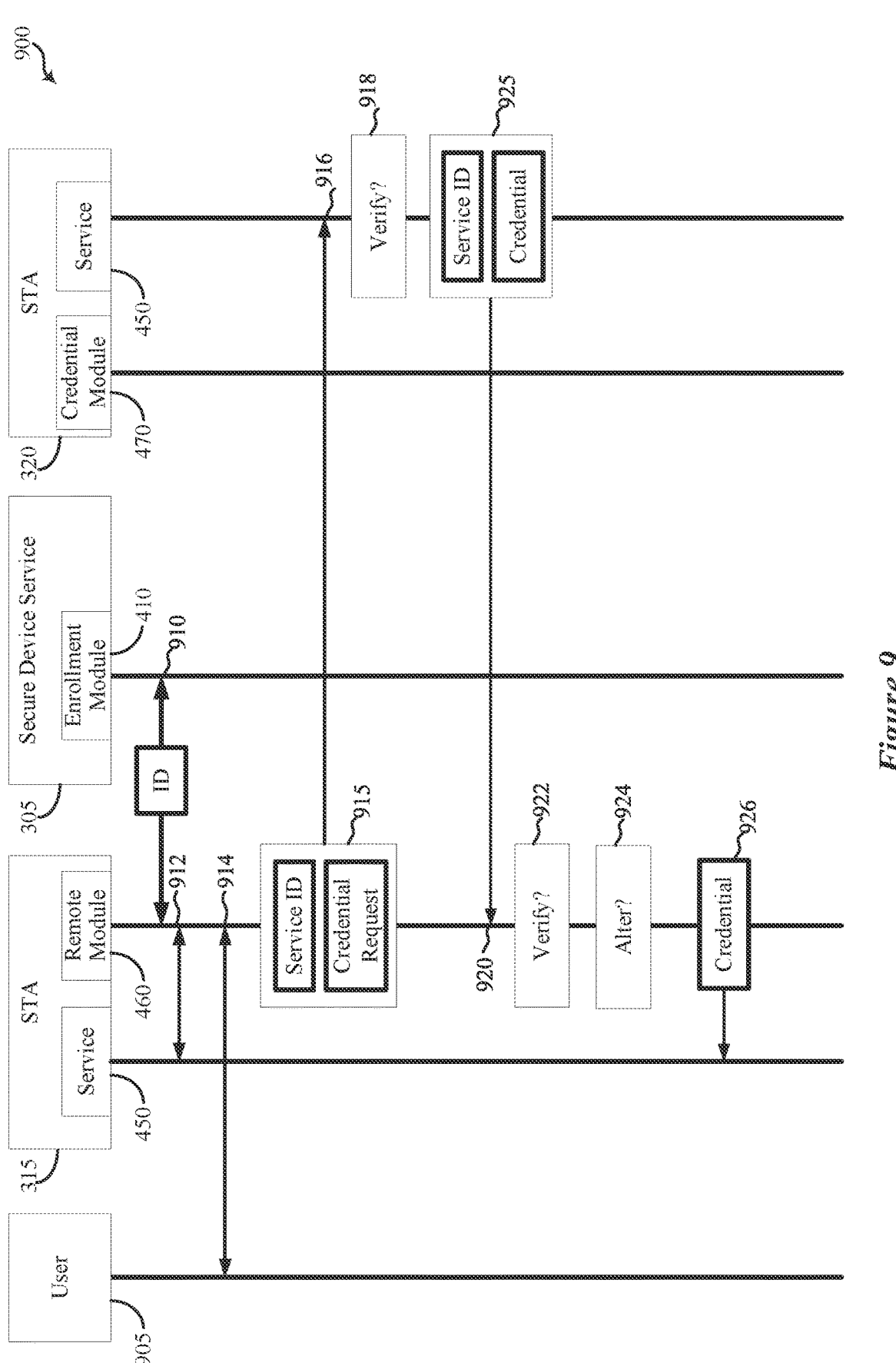
FIG. 9 shows a system flow diagram illustrating an example process that supports remote authentication credential exchange.

FIG. 9 shows a system flow diagram illustrating an example process 900 that supports remote authentication credential exchange. In some examples, the process 900 is an example process for a remote credential exchange for stored credential information including stored biometric credential information. The operations of the process 900 may be implemented by a wireless STA or its components as described herein. For example, the process 900 may be performed by a wireless communication device, such as the wireless STA 1000 described with reference to FIG. 10, operating as or within a wireless STA. In some examples, the process 900 may be performed by a wireless STA such as one of the STAs 104 described with reference to FIG. 1 or by the STA 315 described in reference to FIGS. 3 and 4. Further details of the operations of the process 900 are also described in relation to the operations and examples described in reference to FIG. 8.

In some examples, the system service on the device, such as the system service 450 on the STA 315 uses stored credential information to provide access to the system service and device. For example, a user may sign into an electronic device using the multi-device ID 415. The electronic device, such as the STA 315 may include various biometric sensors, such as fingerprint or visual recognition sensors, which typically require a user to manually add new biometric information on each new device, even when the user may have previously enrolled on a different device. For example, the STA 320 includes the previously stored credential 455 from a previous user enrollment and biometric setup process. In some examples, the user experience and setup of a new electronic device can be delayed and complicated by the input and verification of biometric information on the new device during the enrollment or sign-in process on the electronic device. To avoid this delay, some users may skip or otherwise delay the biometric information step during an initial device setup, which can leave the device and system services on the device less secure. By providing access to previously stored biometric credentials on the STA 320 via remote credential exchange, the user is able to securely update the electronic device with compatible biometric credential information without having to repeat an enrollment process. Additionally, by utilizing a trusted device in a secure device ecosystem for remote authentication credential exchange as described in the process 900, the security of the electronic device and the security of the various system services on the electronic device are not compromised, while also providing access to the needed credential information on the electronic device.

At times 910 and 912, the STA 315 registers as a device in the secure device ecosystem 300. In some examples, the process at time 910 includes authenticating and installing the multi-device ID 415 from the secure device service 305 and the enrollment module 410 during an enrollment process for the new device STA 315. As described in reference to FIGS. 3 and 4, in some examples, the secure device ecosystem 300 includes at least one additional trusted device authenticated to the multi-device ID, such as the trusted devices 310. In some examples at time 910, the STA 315 also initiates remote authentication service module 460 and selects the target device, such as the STA 320 from the at least one additional trusted device in the secure device ecosystem. In some examples, the selection of STA 320 as the target device is based on the ability of the STA 320 to provide the stored biometric credentials in the stored credential 455 to the STA 315.

For example, during an enrollment process with the enrollment module 410 at the secure device service 305, the remote authentication service module 460 selects a target device from the trusted devices 310 to exchange remote credential information with based on the presence of the credential stored at the trusted device. For example, the STA 315 selects the STA 320 as the target device since the STA 320 includes the stored credential 455.

At time 914, the STA 315 displays, to a user 905 and via a user interface of the device, a request to access remote biometric credential information from the target device and receives from the user 905 a confirmation to bypass a current biometric credential enrollment on the device and request the remote biometric credential information. For example, the STA 315 may verify with the user 905 utilizing the STA 315 that the current biometric enrollment process should be suspended and that stored biometric credentials, such as credentials 455 stored on the STA 320 should be access and utilized on the STA 315.

Upon receiving confirmation to access the stored biometric credentials, at time 916 the STA 315 generates a remote credential request 915 in response to receiving the remote authentication interrupt and transmits the remote credential request to the STA 320. In some examples, the remote credential request includes an identification of sensor properties of the biometric credential sensor at the wireless STA, such as the sensor properties of the STA 315.

In some examples, at time 918 the STA 320 verifies that the credential 455 is compatible with biometric sensors at the STA 320. At time 920, the STA 320 generates an authentication response 925. In some examples, the authentication response 725 may include a verification of a compatibility of the remote biometric credential information with the sensor properties included in the remote credential request, indicating the STA 320 performed a verification of the compatibility of the remote biometric credential information and the biometric credential sensor at the device. The STA 320 also transmits the authentication response 725 to the STA 315 and remote authentication service module 460.

At time 922 and upon receiving an authentication response from the target device the wireless STA determines whether the compatibility of the biometric credential is verified. In some examples, the authentication response may include a verification of a compatibility of the remote biometric credential information with the sensor properties included in the remote credential request. In some examples, the remote authentication service module 460 may verify or reverify that the remote biometric credential information is compatible with the biometric credential sensor(s) at the STA 315.

At time 924, the remote authentication service module 460 determines whether alterations are needed for the remote biometric credential information before use with the system service. For example, a fingerprint stored on the STA 320 may be utilized by the STA 315 as a biometric credential after applying compensation factors to adjust for different types of sensors, including different sensor sizes among other factors.

In some examples, the remote authentication service module 460 alters a plurality of biometric templates using a hardware compensation factor to generate a plurality of device compatible biometric templates and updates the missing credential information at the system service 450 with the plurality of device compatible biometric templates at time 926.

Figure 10:
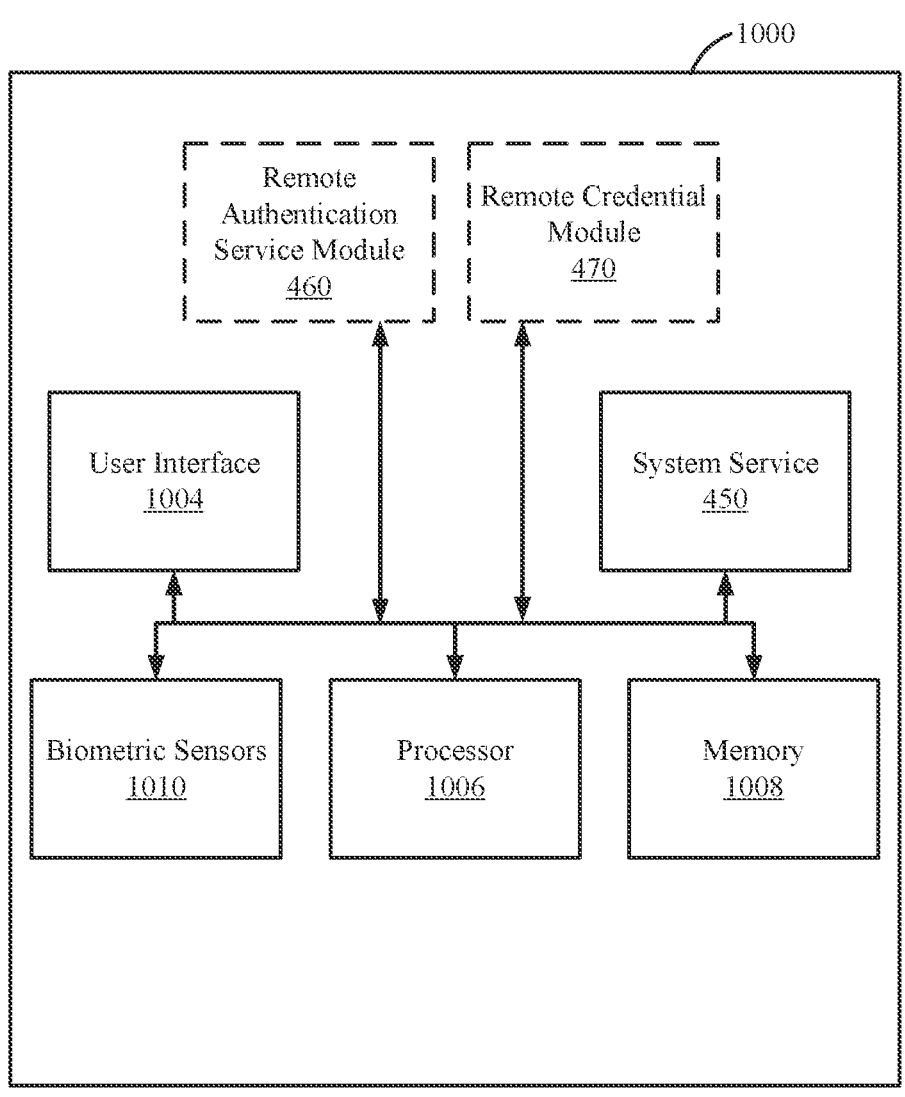
FIG. 10 shows a block diagram of an example a wireless STA that supports that supports remote authentication credential exchange.

FIG. 10 shows a block diagram of an example a wireless STA 1000 that supports that supports remote authentication credential exchange. In some examples, the wireless STA 1000 includes various device components or modules including, based on the function as a primary or secondary/ target device, the remote authentication service module 460 or the remote credential module 470, the system service 450, a processor(s) 1006, a memory 1008, biometric sensors 1010 and a user interface 1004. In some examples, the wireless STA 1000, including the components 1002-1016, is configured to perform the processes 500, 600, 700, 800 and 900. The wireless STA 1000 may include one or more chips, SoCs, chipsets, packages, components, or devices that individually or collectively constitute or include a processing system. The processing system may interface with other components of the wireless STA 1000 and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless STA 1000 may transmit the information output from the chip. In such an example, the second interface may refer to an interface between the processing system of the chip and a reception component, such that the wireless STA 1000 may receive information that is passed to the processing system. In some such examples, the first interface also may obtain information, such as from the transmission component, and the second interface also may output information, such as to the reception component.

The processing system includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless STA 1000 can be configurable or configured for use in a STA, such as the STAs 104, 315 and 320 described with reference to FIGS. 1, 3 and 4. In some other examples, the wireless STA 1000 can be a STA that includes such a processing system and other components including multiple antennas. The wireless STA 1000 is capable of transmitting and receiving wireless communications in the form of, for example, wireless packets. For example, the wireless STA 1000 can be configurable or configured to transmit and receive packets in the form of physical layer PPDUs and MPDUs conforming to one or more of the IEEE 802.11 family of wireless communication protocol standards. In some other examples, the wireless STA 1000 can be configurable or configured to transmit and receive signals and communications conforming to one or more 3GPP specifications including those for 5G NR or 6G. In some examples, the wireless STA 1000 also includes or can be coupled with one or more application processors which may be further coupled with one or more other memories. In some examples, the user interface 1004 includes a touchscreen or keypad and a display, which may be integrated with the UI to form a touchscreen display that is coupled with the processing system. In some examples, the wireless STA 1000 may further include one or more sensors such as, for example, one or more inertial sensors, accelerometers, temperature sensors, pressure sensors, or altitude sensors, that are coupled with the processing system.

Implementation examples are described in the following numbered clauses:

Clause 1. A method for remote authentication credential exchange, including: registering a device in a secure device ecosystem, where the device is authenticated to a multi-device identification (ID), and where the secure device ecosystem includes at least one additional trusted device authenticated to the multi-device ID; generating, at the device, a remote credential request for a system service on the device, where the remote credential request includes an identification of the system service and a request for missing credential information associated with the system service; transmitting, to a target device selected from the at least one additional trusted device in the secure device ecosystem, the remote credential request; receiving, at the device, an authentication response from the target device including remote credential information associated with the system service; and updating the missing credential information at the system service with the remote credential information received from the target device.

Clause 2. The method of clause 1, where registering the device in the secure device ecosystem further includes: initiating a remote authentication service module on the device; selecting, during an initiation process for the device and via the remote authentication service module, the target device from the at least one additional trusted device in the secure device ecosystem, where the target device is able to provide a manually entered remote credential to the device; and transmitting a trusted device notification to the target device to cause the target device to initiate a remote credential module for the device.

Clause 3. The method of any of clauses 1 or 2, where the remote authentication service module on the device communicates with the remote credential module on the target device using encrypted messages, where the authentication response includes an encrypted message received from the target device, and where the method further includes: decrypting, at the remote authentication service module, the authentication response to parse the remote credential information from the encrypted message.

Clause 4. The method of any of clauses 1, 2 or 3, where the system service includes a device access service, where the missing credential information for the device access service includes a manually entered password credential, and where transmitting the remote credential request causes the remote credential module on the target device to display a visual request for a password credential for the system service on a graphical interface of the target device.

Clause 5. The method of any of clauses 1, 2, 3 or 4, further including: receiving, from the device access service, a password error message at the remote authentication service module; transmitting, from the remote authentication service module to the remote credential module, an error authentication request indicating an error in a previously provided password credential; receiving, at the remote authentication service module, an updated authentication response from the target device including at least an updated password credential; and updating the device access service using the updated password credential.

Clause 6. The method of any of clauses 1, 2, 3, 4 or 5, where data and applications stored on the device are in an encrypted state when the device access service is in a locked state, and where the device access service enters the locked state upon a power reboot of the device.

Clause 7. The method of any of clauses 1, 2, 3, 4, 5 or 6, where a user interface associated with the device access service is disabled and prevents a direct manual input of a password credential at the device, and where the device generates the remote credential request in response to receiving a remote authentication interrupt indicating the user interface for the device access service is disabled.

Clause 8. The method of clause 1, where the device includes a biometric credential sensor for receiving biometric information, where the system service includes a biometric credential enrollment service to receive biometric credential information for authentication services on the device via the biometric credential sensor, and where the missing credential information includes the biometric credential information for the authentication services.

Clause 9. The method of any of clauses 1 or 8, where registering the device in the secure device ecosystem further includes: selecting, during an enrollment process at the biometric credential enrollment service, the target device from the at least one additional trusted device in the secure device ecosystem, where the target device includes stored biometric credential information, where the stored biometric credential information is compatible with the biometric credential sensor of the device.

Clause 10. The method of any of clauses 1, 8 or 9, further including: displaying, via a user interface of the device, a request to access remote biometric credential information from the target device; and receiving, via the user interface, a confirmation to bypass a current biometric credential enrollment on the device and request the remote biometric credential information.

Clause 11. The method of any of clauses 1, 8, 9 or 10, where the remote credential request further includes an identification of sensor properties of the biometric credential sensor at the device, where the remote credential information includes remote biometric credential information stored on the target device, and where the authentication response further includes a verification of a compatibility of the remote biometric credential information with the sensor properties, indicating the target device performed a verification of the compatibility of the remote biometric credential information and the biometric credential sensor at the device.

Clause 12. The method of any of clauses 1, 8, 9, 10 or 11, further including: verifying, at the device, the remote credential information received from the target device is compatible with sensor properties of the biometric credential sensor at the device.

Clause 13. The method of any of clauses 1, 8, 9 10, 11 or 12, where the remote credential information includes a plurality of biometric templates, and where updating the missing credential information includes: altering the plurality of biometric templates using a hardware compensation factor to generate a plurality of device compatible biometric templates; and updating the missing credential information at the biometric enrollment service with the plurality of device compatible biometric templates.

Clause 14. A wireless station for remote authentication credential exchange, including: a processing system that includes one or more processors and one or more memories coupled with the one or more processors, the processing system configured to cause the wireless station to: register a wireless station in a secure device ecosystem, where the wireless station is authenticated to a multi-device identification (ID), and where the secure device ecosystem includes at least one additional trusted device authenticated to the multi-device ID; generate, at the wireless station, a remote credential request for a system service on the wireless station, where the remote credential request includes an identification of the system service and a request for missing credential information associated with the system service; transmit, to a target device selected from the at least one additional trusted device in the secure device ecosystem, the remote credential request; receive, at the wireless station, an authentication response from the target device including remote credential information associated with the system service; and update the missing credential information at the system service with the remote credential information received from the target device.

Clause 15. The wireless station of clause 14, where registering the wireless station in the secure device ecosystem further includes: initiating a remote authentication service module on the wireless station; selecting, during an initiation process for the wireless station and via the remote authentication service module, the target device from the at least one additional trusted device in the secure device ecosystem, where the target device is able to provide a manually entered remote credential to the wireless station; and transmitting a trusted device notification to the target device to cause the target device to initiate a remote credential module for the wireless station.

Clause 16. The wireless station of any of clauses 14 or 15, where the remote authentication service module on the wireless station communicates with the remote credential module on the target device using encrypted messages, where the authentication response includes an encrypted message received from the target device, and where the processing system is further configured to cause the wireless station to: decrypting, at the remote authentication service module, the authentication response to parse the remote credential information from the encrypted message.

Clause 17. The wireless station of any of clauses 14, 15 or 16, where the system service includes a device access service, where the missing credential information for the device access service includes a manually entered password credential, and where transmitting the remote credential request causes the remote credential module on the target device to display a visual request for a password credential for the system service on a graphical interface of the target device.

Clause 18. The wireless station of any of clauses 14, 15, 16, or 17, where the processing system is further configured to cause the wireless station to: receive, from the device access service, a password error message at the remote authentication service module; transmit, from the remote authentication service module to the remote credential module, an error authentication request indicating an error in a previously provided password credential; receive, at the remote authentication service module, an updated authentication response from the target device including at least an updated password credential; and update the device access service using the updated password credential.

Clause 19. The wireless station of any of clauses 14, 15, 16, 17 or 18, where data and applications stored on the wireless station are in an encrypted state when the device access service is in a locked state, and where the device access service enters the locked state upon a power reboot of the wireless station.

Clause 20. The wireless station of any of clauses 14, 15, 16, 17, 18 or 19, where a user interface associated with the device access service is disabled and prevents a direct manual input of a password credential at the wireless station, and where the wireless station generates the remote credential request in response to receiving a remote authentication interrupt indicating the user interface for the device access service is disabled.

Clause 21. The wireless station of clause 14, where the wireless station includes a biometric credential sensor for receiving biometric information, where the system service includes a biometric credential enrollment service to receive biometric credential information for authentication services on the wireless station via the biometric credential sensor, and where the missing credential information includes the biometric credential information for the authentication services.

Clause 22. The wireless station of any of clauses 14 or 21, where registering the wireless station in the secure device ecosystem further includes: selecting, during an enrollment process at the biometric credential enrollment service, the target device from the at least one additional trusted device in the secure device ecosystem, where the target device includes stored biometric credential information, where the stored biometric credential information is compatible with the biometric credential sensor of the wireless station.

Clause 23. The wireless station of any of clauses 14, 21 or 22, where the processing system is further configured to cause the wireless station to: display, via a user interface of the wireless station, a request to access remote biometric credential information from the target device; and receive, via the user interface, a confirmation to bypass a current biometric credential enrollment on the wireless station and request the remote biometric credential information.

Clause 24. The wireless station of any of clauses 14, 21, 22 or 23, where the remote credential request further includes an identification of sensor properties of the biometric credential sensor at the wireless station, where the remote credential information includes remote biometric credential information stored on the target device, and where the authentication response further includes a verification of a compatibility of the remote biometric credential information with the sensor properties, indicating the target device performed a verification of the compatibility of the remote biometric credential information and the biometric credential sensor at the wireless station.

Clause 25. The wireless station of any of clauses 14, 21, 22, 23 or 24, where the processing system is further configured to cause the wireless station to: verify, at the wireless station, the remote credential information received from the target device is compatible with sensor properties of the biometric credential sensor at the wireless station.

Clause 26. The wireless station of any of clauses 14, 21, 22, 23, 24 or 25, where the remote credential information includes a plurality of biometric templates, and where updating the missing credential information includes: altering the plurality of biometric templates using a hardware compensation factor to generate a plurality of device compatible biometric templates; and updating the missing credential information at the biometric enrollment service with the plurality of device compatible biometric templates.

Clause 27. A wireless station for remote authentication credential exchange, including: a processing system that includes one or more processors and one or more memories coupled with the one or more processors, the processing system configured to cause the wireless station to: receive a remote credential request from a first device in a secure device ecosystem, where the wireless station and the first device are authenticated to a multi-device identification (ID), where the remote credential request includes an identification of a system service at the first device and a request for missing credential information associated with the system service at the first device; generate an authentication response including the remote credential information associated with the system service at the system service; and transmit the authentication response to the first device in the secure device ecosystem.

Clause 28. The wireless station of clause 27, where the processing system is configured to cause the wireless station to: receive a trusted device notification from the first device; and initiate a remote credential module for communicating with a remote authentication service module on the first device.

Clause 29. The wireless station of any of clauses 27 or 28, where the system service includes a device access service, where the missing credential information for the device access service includes a manually entered password credential, and where the processing system is configured to cause the wireless station to: display a visual request for a password credential for the system service on a graphical interface of the wireless station.

Clause 30. The wireless station of any of clauses 27, 28 or 29, where the first device includes a biometric credential sensor for receiving biometric information, where the system service includes a biometric credential enrollment service to receive biometric credential information for authentication services on the first device via the biometric credential sensor, where the missing credential information includes the biometric credential information for the authentication services, where the remote credential request further includes an identification of sensor properties of the biometric credential sensor at the first device, where the remote credential information includes remote biometric credential information stored on the wireless station, and where the processing system is configured to cause the wireless station to: verify a compatibility of the remote biometric credential information stored on the wireless station and the biometric credential sensor at the first device, where the authentication response further includes a verification of a compatibility of the remote biometric credential information with the sensor properties.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method for remote authentication credential exchange, comprising:

registering a device in a secure device ecosystem, where the device is authenticated to a multi-device identification (ID), and where the secure device ecosystem comprises at least one additional trusted device authenticated to the multi-device ID;

generating, at the device, a remote credential request for a system service on the device, where the remote credential request comprises an identification of the system service and a request for missing credential information associated with the system service;

transmitting, to a target device selected from the at least one additional trusted device in the secure device ecosystem, the remote credential request;

receiving, at the device, an authentication response from the target device comprising remote credential information associated with the system service; and updating the missing credential information at the system service with the remote credential information received from the target device.

2. The method of claim 1, wherein registering the device in the secure device ecosystem further comprises:

initiating a remote authentication service module on the device;

selecting, during an initiation process for the device and via the remote authentication service module, the target device from the at least one additional trusted device in the secure device ecosystem, wherein the target device is able to provide a manually entered remote credential to the device; and transmitting a trusted device notification to the target device to cause the target device to initiate a remote credential module for the device.

3. The method of claim 2, wherein the remote authentication service module on the device communicates with the remote credential module on the target device using encrypted messages, wherein the authentication response comprises an encrypted message received from the target device, and wherein the method further comprises:

decrypting, at the remote authentication service module, the authentication response to parse the remote credential information from the encrypted message.

4. The method of claim 2, wherein the system service comprises a device access service, wherein the missing credential information for the device access service comprises a manually entered password credential, and wherein transmitting the remote credential request causes the remote credential module on the target device to display a visual request for a password credential for the system service on a graphical interface of the target device.

5. The method of claim 4, further comprising:

receiving, from the device access service, a password error message at the remote authentication service module;

transmitting, from the remote authentication service module to the remote credential module, an error authentication request indicating an error in a previously provided password credential;

receiving, at the remote authentication service module, an updated authentication response from the target device comprising at least an updated password credential; and updating the device access service using the updated password credential.

6. The method of claim 4, wherein data and applications stored on the device are in an encrypted state when the device access service is in a locked state, and wherein the device access service enters the locked state upon a power reboot of the device.

7. The method of claim 6, wherein a user interface associated with the device access service is disabled and prevents a direct manual input of a password credential at the device, and wherein the device generates the remote credential request in response to receiving a remote authentication interrupt indicating the user interface for the device access service is disabled.

8. The method of claim 1, wherein the device comprises a biometric credential sensor for receiving biometric information, wherein the system service comprises a biometric credential enrollment service to receive biometric credential information for authentication services on the device via the biometric credential sensor, and wherein the missing credential information comprises the biometric credential information for the authentication services.

9. The method of claim 8, wherein registering the device in the secure device ecosystem further comprises:

selecting, during an enrollment process at the biometric credential enrollment service, the target device from the at least one additional trusted device in the secure device ecosystem, wherein the target device comprises stored biometric credential information, wherein the stored biometric credential information is compatible with the biometric credential sensor of the device.

10. The method of claim 9, further comprising:

displaying, via a user interface of the device, a request to access remote biometric credential information from the target device; and receiving, via the user interface, a confirmation to bypass a current biometric credential enrollment on the device and request the remote biometric credential information.

11. The method of claim 8, wherein the remote credential request further comprises an identification of sensor properties of the biometric credential sensor at the device, wherein the remote credential information comprises remote biometric credential information stored on the target device, and wherein the authentication response further comprises a verification of a compatibility of the remote biometric credential information with the sensor properties, indicating the target device performed a verification of the compatibility of the remote biometric credential information and the biometric credential sensor at the device.

12. The method of claim 8, further comprising:

verifying, at the device, the remote credential information received from the target device is compatible with sensor properties of the biometric credential sensor at the device.

13. The method of claim 8, wherein the remote credential information comprises a plurality of biometric templates, and wherein updating the missing credential information comprises:

altering the plurality of biometric templates using a hardware compensation factor to generate a plurality of device compatible biometric templates; and updating the missing credential information at the biometric enrollment service with the plurality of device compatible biometric templates.

14. A wireless station for remote authentication credential exchange, comprising:

a processing system that includes one or more processors and one or more memories coupled with the one or more processors, the processing system configured to cause the wireless station to:

register a wireless station in a secure device ecosystem, where the wireless station is authenticated to a multi-device identification (ID), and where the secure device ecosystem comprises at least one additional trusted device authenticated to the multi-device ID;

generate, at the wireless station, a remote credential request for a system service on the wireless station, where the remote credential request comprises an identification of the system service and a request for missing credential information associated with the system service;

transmit, to a target device selected from the at least one additional trusted device in the secure device ecosystem, the remote credential request;

receive, at the wireless station, an authentication response from the target device comprising remote credential information associated with the system service; and update the missing credential information at the system service with the remote credential information received from the target device.

15. The wireless station of claim 14, wherein registering the wireless station in the secure device ecosystem further comprises:

initiating a remote authentication service module on the wireless station;

selecting, during an initiation process for the wireless station and via the remote authentication service module, the target device from the at least one additional trusted device in the secure device ecosystem, wherein the target device is able to provide a manually entered remote credential to the wireless station; and transmitting a trusted device notification to the target device to cause the target device to initiate a remote credential module for the wireless station.

16. The wireless station of claim 15, wherein the remote authentication service module on the wireless station communicates with the remote credential module on the target device using encrypted messages, wherein the authentication response comprises an encrypted message received from the target device, and wherein the processing system is further configured to cause the wireless station to:

decrypting, at the remote authentication service module, the authentication response to parse the remote credential information from the encrypted message.

17. The wireless station of claim 15, wherein the system service comprises a device access service, wherein the missing credential information for the device access service comprises a manually entered password credential, and wherein transmitting the remote credential request causes the remote credential module on the target device to display a visual request for a password credential for the system service on a graphical interface of the target device.

18. The wireless station of claim 17, wherein the processing system is further configured to cause the wireless station to:

receive, from the device access service, a password error message at the remote authentication service module;

transmit, from the remote authentication service module to the remote credential module, an error authentication request indicating an error in a previously provided password credential;

receive, at the remote authentication service module, an updated authentication response from the target device comprising at least an updated password credential; and update the device access service using the updated password credential.

19. The wireless station of claim 17, wherein data and applications stored on the wireless station are in an encrypted state when the device access service is in a locked state, and wherein the device access service enters the locked state upon a power reboot of the wireless station.

20. The wireless station of claim 19, wherein a user interface associated with the device access service is disabled and prevents a direct manual input of a password credential at the wireless station, and wherein the wireless station generates the remote credential request in response to receiving a remote authentication interrupt indicating the user interface for the device access service is disabled.

21. The wireless station of claim 14, wherein the wireless station comprises a biometric credential sensor for receiving biometric information, wherein the system service comprises a biometric credential enrollment service to receive biometric credential information for authentication services on the wireless station via the biometric credential sensor, and wherein the missing credential information comprises the biometric credential information for the authentication services.

22. The wireless station of claim 21, wherein registering the wireless station in the secure device ecosystem further comprises:

selecting, during an enrollment process at the biometric credential enrollment service, the target device from the at least one additional trusted device in the secure device ecosystem, wherein the target device comprises stored biometric credential information, wherein the stored biometric credential information is compatible with the biometric credential sensor of the wireless station.

23. The wireless station of claim 22, wherein the processing system is further configured to cause the wireless station to:

display, via a user interface of the wireless station, a request to access remote biometric credential information from the target device; and receive, via the user interface, a confirmation to bypass a current biometric credential enrollment on the wireless station and request the remote biometric credential information.

24. The wireless station of claim 21, wherein the remote credential request further comprises an identification of sensor properties of the biometric credential sensor at the wireless station, wherein the remote credential information comprises remote biometric credential information stored on the target device, and wherein the authentication response further comprises a verification of a compatibility of the remote biometric credential information with the sensor properties, indicating the target device performed a verification of the compatibility of the remote biometric credential information and the biometric credential sensor at the wireless station.

25. The wireless station of claim 21, wherein the processing system is further configured to cause the wireless station to:

verify, at the wireless station, the remote credential information received from the target device is compatible with sensor properties of the biometric credential sensor at the wireless station.

26. The wireless station of claim 21, wherein the remote credential information comprises a plurality of biometric templates, and wherein updating the missing credential information comprises:

altering the plurality of biometric templates using a hardware compensation factor to generate a plurality of device compatible biometric templates; and updating the missing credential information at the biometric enrollment service with the plurality of device compatible biometric templates.

* * * * *